United States Patent
Groh (10) Patent No.: US 11,615,274 B2
(45) Date of Patent: Mar. 28, 2023

(54) PLAUSIBILITY CHECK OF THE OUTPUT OF NEURAL CLASSIFIER NETWORKS BASED ON ADDITIONAL INFORMATION ABOUT FEATURES

(71) Applicant: Robert Bosch GmbH, Stuttgart (DE)

(72) Inventor: Konrad Groh, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 161 days.

(21) Appl. No.: 17/187,004

(22) Filed: Feb. 26, 2021

(65) Prior Publication Data
US 2021/0295106 A1    Sep. 23, 2021

(30) Foreign Application Priority Data
Mar. 23, 2020   (DE) .......................... 102020203705.1

(51) Int. Cl.
G06K 9/62   (2022.01)
G06V 30/194 (2022.01)

(52) U.S. Cl.
CPC ........... *G06K 9/6262* (2013.01); *G06K 9/627* (2013.01); *G06V 30/194* (2022.01)

(58) Field of Classification Search
CPC ... G06T 2207/20084; G06T 7/70; G06T 7/73; G06T 2207/10016; G06T 2207/20081; G06T 2207/30244; G06T 2207/30252; G06V 20/58; G06V 10/255; G06V 10/764; G06V 10/7715; G06V 30/194;
(Continued)

(56) References Cited

U.S. PATENT DOCUMENTS

2021/0201082 A1\* 7/2021 Iyer ...................... G06K 9/6228
2021/0223780 A1\* 7/2021 Bramley ................ G06K 9/628

FOREIGN PATENT DOCUMENTS

GB       2454857 A     5/2009

OTHER PUBLICATIONS

Bojarski, Mariusz, et al. "Visualbackprop: Efficient visualization of cnns for autonomous driving." 2018 IEEE International Conference on Robotics and Automation (ICRA). IEEE, 2018. (Year: 2018).\*
(Continued)

*Primary Examiner* — Vincent Rudolph
*Assistant Examiner* — Hernan Arias
(74) *Attorney, Agent, or Firm* — Norton Rose Fulbright US LLP; Gerard Messina (57) ABSTRACT

A method for a plausibility check of the output of an artificial neural network (ANN) utilized as a classifier. The method includes: a plurality of images for which the ANN has ascertained an association with one or multiple classes of a predefined classification, and the association that is ascertained in each case by the ANN, are provided; for each image at least one feature parameter is determined which characterizes the type, the degree of specificity, and/or the position of at least one feature contained in the image; for each combination of an image and an association, a spatially resolved relevance assessment of the image is ascertained by applying a relevance assessment function; a setpoint relevance assessment is ascertained for each combination, using the feature parameter; a quality criterion for the relevance assessment function is ascertained based on the agreement between the relevance assessments and the setpoint relevance assessments.

16 Claims, 5 Drawing Sheets

(58) Field of Classification Search
CPC .. G06V 10/82; G06V 20/56; G06V 30/19173; G06V 10/774; G06V 10/25; G06V 20/38; G06V 30/191; G06V 2201/10; G06N 3/02; G06N 3/0454; G06N 3/088; G06N 3/049; G06N 3/0445; G06N 3/08; G06K 9/6267; G06K 9/6256; G05D 1/0088; G05D 1/0246
See application file for complete search history.

(56) References Cited

OTHER PUBLICATIONS

Yin, Peng-Yeng, et al. "Integrating relevance feedback techniques for image retrieval using reinforcement learning." IEEE transactions on pattern analysis and machine intelligence 27.10 (2005): 1536-1551. (Year: 2005).*

Shin, Myung-Ok, and Seung-Woo Seo. "Vehicle recognition using common appearance captured by 3D LiDAR and monocular camera." 2017 IEEE Intelligent Vehicles Symposium (IV). IEEE, 2017. (Year: 2017).*

Yin, Peng-Yeng, et al. "Long-term cross-session relevance feedback using virtual features." IEEE Transactions on Knowledge and Data Engineering 20.3 (2008): 352-368. (Referred as Yin 2) (Year: 2008).*

\* cited by examiner

PLAUSIBILITY CHECK OF THE OUTPUT OF NEURAL CLASSIFIER NETWORKS BASED ON ADDITIONAL INFORMATION ABOUT FEATURES

CROSS REFERENCE

The present application claims the benefit under 35 U.S.C. § 119 of German Patent Application No. DE 102020203705.1 filed on Mar. 23, 2020, which is expressly incorporated herein by reference in its entirety.

FIELD

The present invention relates to the plausibility check of the output of neural classifier networks that are used, for example, for recognizing objects from image data.

BACKGROUND INFORMATION

Approximately 90% of the information required by a human driver for driving a vehicle in traffic is visual information. For the at least semi-automated driving of vehicles, it is therefore essential to accurately evaluate the content of images, whatever their modality, that are recorded during the monitoring of the vehicle surroundings. Of particular importance for the driving task is a classification of the images with regard to which traffic-relevant objects such as other road users, lane markings, obstacles, and traffic signs are contained in the images.

Artificial neural networks are used to deal with this complexity. Neural networks of this type may be made up, for example, of multiple layers connected in succession, in which the dimensionality of the task is greatly reduced by applying convolution kernels and by downsampling. In addition, such neural networks are characterized in that large volumes of data are processed in parallel. Great Britain Patent No. GB 2 454 857 B describes an example of a method in which a microscopic image is classified with regard to which objects it contains, with the aid of a self-learning neural network.

Since this involves a safety-relevant functionality, the reliability of the object recognition for authorization for traffic must be demonstrated, and monitored during operation of the vehicle.

SUMMARY

In accordance with the present invention, a method is provided for the plausibility check of the output of an artificial neural network (ANN) that is utilized as a classifier.

In accordance with an example embodiment of the present invention, in this method, a plurality of images for which the ANN has in each case ascertained an association with one or multiple classes of a predefined classification is provided. The classes may represent, for example, different road users, traffic signs, roadway boundaries, or other objects. The particular association is likewise provided. Thus, pairings of images on the one hand and associations with one or multiple classes on the other hand are present. The association may in particular be a vector, for example, in which in each case a component for exactly one class indicates the likelihood and/or confidence that is to be accorded to the image of this class. The vector may be a "one-hot" vector, for example, in which only one component is equal to 1 while all other components are equal to 0. However, the vector may also be a softmax vector, for example, and may include multiple components, different from zero, that sum to 1.

For each image, at least one feature parameter is determined which characterizes the type, the degree of specificity, and/or the position of at least one feature contained in the image. This feature parameter may originate from an arbitrary source. It may, for example, be evaluated from the image, using an arbitrary method. Alternatively or also in combination therewith, measured data of other sensors may be used for this evaluation. The image may also be generated at the outset in such a way that it includes a certain desired feature parameter.

For each combination of an image and an association, a spatially resolved relevance assessment of the image is ascertained by applying a relevance assessment function. This relevance assessment ("saliency map") indicates which portions of the image, and to what extent, have contributed to the association. Such a relevance assessment may be utilized in various ways to check the plausibility of the output of the ANN.

Thus, for example, for certain combinations of an image and an association, a random visual check may be made as to whether the decision to associate an object with the "passenger automobile" class, for example, has been made based primarily on image areas that actually show a passenger automobile. However, if an object has been classified as a passenger automobile, but this decision has been made based on image areas that show a tree, for example, this association is not definitive at all. Even if the image actually shows a passenger automobile at another location, the fact remains that image areas that show a tree have been incorrectly classified as a passenger automobile. Therefore, for complex settings containing a plurality of objects, there is concern that the set of objects recognized overall in an image of the setting is ultimately not congruent with the set of objects that are actually present in the setting.

Alternatively, or also in combination therewith, the relevance assessment may be evaluated automatically using arbitrary automated methods, which then allows the step of random checking for 100% inspection of all associations ascertained by the ANN. Exemplary embodiments of such an automatic evaluation are set forth below.

Regardless of whether the relevance assessment is evaluated visually or automatically, the credibility of this assessment depends on the relevance assessment function being applicable for the particular application. Many such relevance assessment functions, which in each case have been developed for certain applications, are known in the literature. There is no a priori mathematical guarantee that a specific relevance assessment function is applicable for a specific application.

Therefore, a setpoint relevance assessment is ascertained for each combination of an image and an association, using the feature parameter. A quality criterion for the relevance assessment function is ascertained based on the agreement between the relevance assessments and the setpoint relevance assessments.

The agreement may be ascertained according to an arbitrary metric, for example by evaluating a correlation function.

It has been found that the additional information contained in the feature parameter may thus be utilized to check the extent to which the relevance assessment function is applicable for the specific application.

In particular, for many specific classification tasks, definitive rules may indicate for which differences between two images an applicable relevance assessment function either is not to be changed, or is to be changed equivariantly with respect to these differences.

For example, if certain pixels are occupied by a vehicle in a first image, and in a second image the same pixels are occupied by a billboard at the roadside, then for the classification of the first image these pixels are relevant for associating this first image with the "vehicle" class. For the classification of the second image, the same pixels are relevant to the same extent for associating this second image with the "billboard" class. Thus, if relevance assessments are formed in each case for combining the first image with the association with the "vehicle" class on the one hand, and for combining the second image with the association with the "billboard" class on the other hand, then the stated pixels in both relevance assessments are to be assessed as equally relevant. A relevance assessment function that is applicable for classification tasks should thus be invariant with respect to the mere exchange of one object with an object of another type, having the same size. Likewise, the relevance assessment function should be invariant, for example, with respect to the make or the design of a vehicle, the age, gender, or skin color of a person, and other properties, provided that they are not important with regard to the association of an object with certain classes. Thus, for example, gender is not important when, within the scope of the predefined classification, a query involves only whether or not the object is a person, even though the predefined classification may very well differ by gender.

If the same object of a certain class is situated in a first image at a first position and in a second image at another position, in the first image a first set of pixels is relevant, and in the second image a second set of pixels is relevant, for the association of the image with the class. It is also expected that with the movement of the object from one location to another, the representation of this object in the spatially resolved relevance assessment also moves in the same way. A relevance assessment function that is applicable for classification tasks should thus be equivariant with respect to a change in the position of the object. The same applies for the size of an object or also for its apparent size, which changes when the object moves toward or away from the image sensor.

The stated examples show that the invariance or equivariance of the relevance assessment function may be checked particularly well compared to two or more combinations of images and associations.

Therefore, in one particularly advantageous embodiment of the present invention, based on a first combination of a first image and a first association,
a spatially resolved relevance assessment of this combination, and
a first feature parameter of the first image, the setpoint relevance assessment for a second combination of a second image and a second association, and for a second feature parameter of the second image, is ascertained by updating the spatially resolved relevance assessment based on the difference between the first feature parameter and the second feature parameter.

For example, it may be reflected in the update that the relevance of a moving object is to be included along with the physical movement of the object in the spatially resolved relevance assessment, or that the mere exchange of the object with an object of the same size is not to change the relevance assessment.

In a further particularly advantageous embodiment in accordance with the present invention, the second image arises from the first image by a transformation and/or processing which leave(s) the feature parameter unchanged or change(s) it to a new feature parameter in a known manner.

For example, if the image is merely noisy, blurred, or colored differently, it still shows the same objects at the same positions. Such processing, which does not change the feature parameter, ideally therefore should not result in a change in the relevance assessment. By such processing, it may thus be tested whether the relevance assessment function is resistant to changes that have nothing to do with the semantic content of the image.

In contrast, if the object is spatially shifted in the transition from the first image to the second image, a feature parameter that represents the position of the object changes, and it is expected that the pixels that are relevant with regard to this object correspondingly shift in the spatially resolved relevance assessment.

For example, in particular at least one image may be synthetically generated by specifying the particular feature parameter. This is easier to achieve than, for example, introducing a precisely defined change into a camera image without also changing other aspects of the image at the same time.

For example, by use of a generator such as a generative adversarial network (GAN), a described setting containing metainformation such as the number, position, and type of objects,
description of the background and of the roadway pattern, and
description of the surrounding conditions, may be converted into a photorealistic image. In addition, the classes with which the ANN is to associate this generated image arise from the metadata. During the formation of the relevance assessment, the image may then be associated with these classes instead of with the classes that are actually supplied by the ANN.

In a further particularly advantageous embodiment of the present invention, at least one feature parameter is evaluated from measured data that have been detected using at least one physical sensor. This physical sensor is different from the sensor that is used for recording the image.

For example, the position of objects may be tracked with a radar sensor or LIDAR sensor, and based on this feature parameter a check may be made as to whether relevant pixels are also correspondingly moving together in the spatially resolved relevance assessment. The evaluation of the particular feature parameter of interest, based on additionally recorded measured data, may be easier and more reliable than extracting this feature parameter from images.

In one particularly advantageous embodiment of the present invention, the quality criterion is ascertained for a selection of multiple candidate relevance assessment functions. A candidate relevance assessment function having the best value of the quality criterion is selected as the relevance assessment function. It is then much more plausible that this specific relevance assessment function in the specific application correctly measures the relevance of image areas for decisions of the ANN.

In a further particularly advantageous embodiment of the present invention, the quality criterion is additionally ascertained for the identical depiction of the image, and/or
an area filled with random values, and/or
an area filled with a constant value, and/or
a semantic segmentation of the image, and/or
an edge detection from the image as the spatially resolved comparative relevance assessment.

These comparative relevance assessments correspond to relevance assessment functions that contain no knowledge of the architecture of the ANN used, and thus represent a "guess" of the relevance assessment.

Each relevance assessment function that is motivated by knowledge about the architecture of the ANN and/or about the specific application is intended to achieve a better quality criterion than a relevance assessment function that manages completely without such knowledge. This is roughly comparable to a situation in which any fund manager who is managing a stock portfolio for an investment fund expects at least one performance of the portfolio that is better than an average portfolio, created by a random generator, in the same time period. If the fund manager does not accomplish this, it is to be assumed that his/her operating method has fundamental flaws.

Therefore, in particular a relevance assessment function or candidate relevance assessment function, for example, whose quality criterion is poorer than the quality criterion of the comparative relevance assessment function may be discarded as implausible.

In a further particularly advantageous embodiment of the present invention, a parameterized approach with free parameters may be established for the relevance assessment function. The parameters of this approach may then be optimized with the objective that the quality criterion of the relevance assessment function assumes an extreme value. The quality criterion is thus in a manner of speaking a yardstick for the optimization.

The sought plausibility of the output of the ANN may be evaluated based on the relevance assessment function and/or based on the quality criterion of this relevance assessment function and/or based on a relevance assessment that is ascertained with this relevance assessment function. Regardless of how this evaluation takes place, it is established on a quantitatively motivated basis.

The plausibility may, for example, be an explicit function of the quality criterion. Thus, for example, the mere existence of any relevance assessment function having a particularly advantageous quality criterion may indicate that the output of the ANN as a whole is conclusive and plausible: What is inherently contradictory cannot be conclusively explained by a relevance assessment function, no matter how it is configured.

However, the quality criterion may, for example, also enter directly into the ascertainment of the plausibility, in that the relevance assessment function that best fits the particular application is found by optimizing the quality criterion, and this relevance assessment function is in turn used to evaluate the plausibility of the output of the ANN.

In a further particularly advantageous embodiment of the present invention, the ascertained plausibility is output to a user of the ANN via a display. It is thus possible for the user to recognize malfunctions of an ANN utilized as a classifier in a timely manner, and to initiate countermeasures. The ANN thus loses the character of a "black box," and instead its behavior becomes explainable. In turn, a technical system that triggers actions based on associations with classes that are ascertained using the classifier thus becomes more reliably operable.

As explained above, the evaluation may take place in particular automatically. For this purpose, the present invention provides a further method for a plausibility check of the output of an ANN that is utilized as a classifier.

Within the scope of this method, at least one image for which the ANN has ascertained an association with one or multiple classes of a predefined classification is provided. In addition, this association ascertained by the ANN is also provided.

For the combination of the image and the association, a spatially resolved relevance assessment of the image is ascertained by applying a relevance assessment function, this relevance assessment indicating which portions of the image, and to what extent, have contributed to the association. This relevance assessment function may have been selected and/or formed, for example, in the course of the method explained above, so that it is quantitatively motivated to a particularly high degree. However, the relevance assessment function may also originate from some other arbitrary source.

A correlation between the relevance assessment on the one hand, and a semantic segmentation of the image and/or an edge detection from the image, on the other hand, is ascertained. When the relevance assessment, the semantic segmentation, and/or the edge detection are/is present in each case as two-dimensional images, for example, the correlation may be ascertained as a two-dimensional discrete cross-correlation, for example. The correlation is evaluated as a measure for the plausibility of the output of the ANN.

The semantic segmentation of the image may utilize associations of image areas with classes that the examined ANN, or also some other arbitrary ANN, has supplied. However, the semantic segmentation may also originate from some other arbitrary source. Likewise, the edge detection may be ascertained with or without use of an ANN.

The absolute value of the correlation will be a function of how the semantic segmentation or the edge detection is ascertained. However, when the class association using the ANN is correctly functioning, during operation of the ANN the absolute value should not significantly change, or should change only within certain limits. The extent to which the class association is still reliably functioning may thus be monitored during operation of the ANN and of the image recording that feeds this ANN with images.

For example, during travel, the image quality delivered by a camera system may suddenly become much poorer because the vehicle drives into a fog bank or because the low sun suddenly fully strikes the camera sensor and drives it into saturation. Edges are then much more difficult to recognize than under good recording conditions. Thus, with the spatially resolved relevance assessment remaining unchanged, the correlation decreases, so that the output of the ANN is assessed as less plausible.

However, it is also possible, for example, for a traffic sign that is newly introduced by regulatory authorities to be misclassified by an ANN that is not yet trained for this traffic sign. Thus, for example, the "environmental zone" traffic sign is understood essentially the same as the "speed limit 30 zone" traffic sign; only the number "30" has been exchanged for the word "environmental." An ANN that does not yet know the "environmental zone" traffic sign will therefore probably associate an image of this traffic sign with the "speed limit 30 zone" class. However, the spatially resolved relevance assessment for the area of the image containing the word "environmental" will be lower than for the remainder of the image that does not differ from an image of a "speed limit 30 zone" traffic sign. Thus, the spatially resolved relevance assessment in the area containing the word "environmental" correlates more poorly with the edges visible in the image than is the case in the remainder of the image. Therefore, the output of the ANN is assessed as less plausible.

Furthermore, for example a targeted attempt may be made to provoke a misclassification by the ANN by manipulating the image with malicious intent. Thus, for example, a traffic sign may be altered by affixing seemingly inconspicuous adhesive stickers in such a way that it is recognized by the ANN as a traffic sign having a completely different meaning (for example, "speed limit 70" instead of "stop"). In this case, the ANN considers the adhesive sticker to be more relevant than, for example, the octagonal shape of the stop sign that is clearly recognizable in the edge detection. The correlation of the relevance assessment with the edge detection is thus poor.

In one particularly advantageous embodiment of the present invention, in response to the correlation falling below a predefined threshold value, a technical system that acts at least semi-automatedly based on the association ascertained by the ANN is activated in such a way that disadvantageous consequences of an incorrect association are reduced.

Thus, for example, an at least semi-automated vehicle may drive more slowly and/or more defensively in order to increase the likelihood of avoiding collisions or at least mitigate their consequences. An access control system that checks a presented access medium (such as an identification card or a biometric feature) may refuse entry or require additional authentication (such as a PIN) in the event of a poor correlation. A quality control system for products manufactured in series may supply products to a more time-consuming but more rigorous verification method. A system for the evaluation of medical image data may mark images or image areas, in which the correlation is poor, for checking by an expert.

In a further particularly advantageous embodiment of the present invention, an image is selected that has arisen by observing the surroundings of a robot and/or vehicle. The robot and/or vehicle may in particular be semi-autonomous, for example. In response to the correlation falling below a predefined threshold value, the robot and/or vehicle are/is controlled in such a way that at least one additional physical sensor for observing the surroundings of the robot and/or vehicle is activated; and/or the travel velocity of an at least semi-automatedly driving robot and/or vehicle is reduced; and/or a driving assistance system and/or a system for the at least semi-automated driving of the robot and/or vehicle are/is completely or partially deactivated, and/or a robot or an at least semi-automatedly driving vehicle is brought to a standstill on a preplanned emergency stop trajectory.

Thus, for example, in response to the correlation between the spatially resolved relevance assessment of a camera image and the edges that are visible in this camera image becoming poorer, a radar sensor or a LIDAR sensor may be connected to resolve discrepancies and/or uncertainties in the recognition of objects. In the stated example, in which the low sun shines on the camera, this must not interfere with the radar sensor.

In particular, for example various threshold values for the correlation may be established, and different actions are triggered when the value falls below these threshold values. Thus, for example, if the value falls below a first threshold value, the vehicle on the expressway may drive into the slower traffic flow in the right lane in order to stop in the emergency lane if the value falls below a second threshold value.

The ANN may in particular be a convolutional ANN. The relevance assessment function may then, for example, involve a weighted sum of activation maps of multiple convolution kernels which in a layer of the ANN are applied to the image or to a processing product of the image.

The example methods in accordance with the present invention may in particular be implemented completely or partially by computer. Therefore, the present invention further relates to a computer program that includes machine-readable instructions which, when executed on one or multiple computers, prompt the computer(s) to carry out one of the described methods. In this sense, control units for vehicles and embedded systems for technical devices which are likewise capable of executing machine-readable instructions are to be regarded as computers.

Moreover, the present invention relates to a machine-readable data medium and/or a download product that includes the computer program. A download product is a digital product that is transmittable via a data network, i.e., downloadable by a user of the data network, and that may be offered for sale in an online store, for example, for immediate download.

In addition, a computer may be equipped with the computer program, the machine-readable data medium, or the download product.

Further measures that enhance the present invention are described in greater detail below with reference to figures, together with the description of the preferred exemplary embodiments of the present invention.

DETAILED DESCRIPTION OF EXAMPLE EMBODIMENTS

Figure 1:
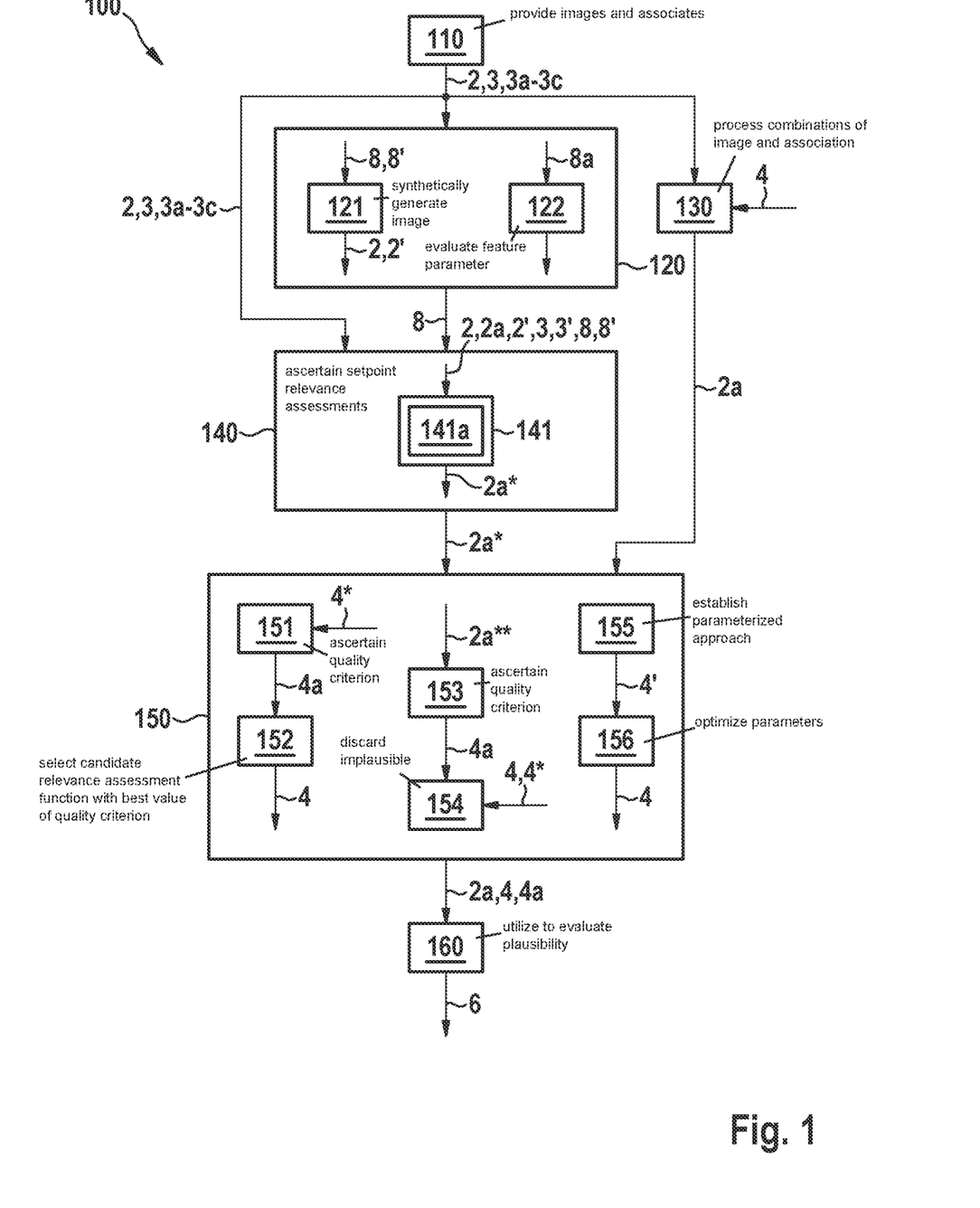
FIG. 1 shows one exemplary embodiment of method 100 with which a quality criterion 4a for a relevance assessment function 4 is ascertained, in accordance with the present invention.

FIG. 1 is a schematic flowchart of one exemplary embodiment of method 100. This method is used primarily to ascertain a quality criterion 4a for a relevance assessment function 4. This in turn allows evaluation of a plausibility 6 of the output of ANN 1.

Images 2 as well as associations 3 of these images 2 for classes 3a through 3c of a predefined classification are provided in step 110.

For each image, at least one feature parameter 8 that characterizes the type, the degree of specificity, and/or the position of at least one feature contained in image 2 is determined in step 120.

This may take place according to block 121, for example, in that at least one image 2, 2' is synthetically generated by specifying particular feature parameter 8, 8'.

Alternatively or in combination therewith, according to block 122, for example, at least one feature parameter 8, 8' may be evaluated from measured data 8a. These measured data 8a have been detected using at least one physical sensor that is different from the sensor used for recording image 2, 2'.

Combinations of an image 2 and an association 3 in each case are processed in step 130 to form a relevance assessment 2a of image 2 with the aid of a relevance assessment function 4. This relevance assessment 2a indicates which portions of image 2, and to what extent, have contributed to association 3.

For each combination of an image 2 and an association 3, a setpoint relevance assessment 2a* is ascertained in step 140, using feature parameter 8. This setpoint relevance assessment 2a* represents the spatially resolved relevance assessment 2a which a relevance assessment function 4, applicable for the specific application, is to supply for specific image 2 and specific association 3.

For example, according to block 141, based on
- a first combination of a first image 2 and a first association 3,
- a spatially resolved relevance assessment 2a of this combination, and
- a first feature parameter 8 of first image 2, setpoint relevance assessment 2a* is ascertained for a second combination of a second image 2' and a second association 3', and is ascertained for a second feature parameter 8' of second image 2' by updating spatially resolved relevance assessment 2a based on the difference between first feature parameter 8 and second feature parameter 8'. It may thus be tested whether the examined relevance assessment function 4 is invariant or equivariant under certain developments of feature parameter 8, 8'.

For this purpose, for example according to block 141a, second image 2' may arise from first image 2 by a transformation and/or processing which leave(s) feature parameter 8 unchanged or change(s) it to a new feature parameter 8' in a conventional manner. The synthetic generation of images discussed above may also be used for the update.

A quality criterion 4a for relevance assessment function 4 is ascertained in step 150, based on the agreement between relevance assessments 2a and setpoint relevance assessments 2a*.

Various exemplary embodiments are provided within box 150 that indicate how, with the aid of quality criterion 4a, a relevance assessment function 4 that is particularly suitable for the particular application may also be found at the same time.

According to block 151, quality criterion 4a may be ascertained for a selection of multiple candidate relevance assessment functions 4*. According to block 152, a candidate relevance assessment function 4* having the best value of the quality criterion may then be selected as relevance assessment function 4.

According to block 153, quality criterion 4a may additionally be ascertained for
- the identical depiction of image 2, and/or
- an area filled with random values, and/or
- an area filled with a constant value, and/or
- a semantic segmentation 2b of image 2, and/or
- an edge detection 2c from image 2 as spatially resolved comparative relevance assessment 2a**.

According to block 154, a relevance assessment function 4 or candidate relevance assessment function 4* whose quality criterion 4a is poorer than quality criterion 4a ascertained for comparative relevance assessment function 2a** may then be discarded as implausible.

According to block 155, a parameterized approach 4' with free parameters may be established for relevance assessment function 4. The parameters of this approach 4' may then be optimized according to block 156, with the objective that quality criterion 4a of relevance assessment function 4 assumes an extreme value.

Relevance assessment function 4 and/or quality criterion 4a of this relevance assessment function and/or a relevance assessment 2a that is ascertained with this relevance assessment function 4 may be utilized in step 160 to evaluate a plausibility 6 of the output of ANN 1. However, this is optional. Method 100 may also be applied, for example, for the sole purpose of finding an optimal relevance assessment function 4.

Figure 2:
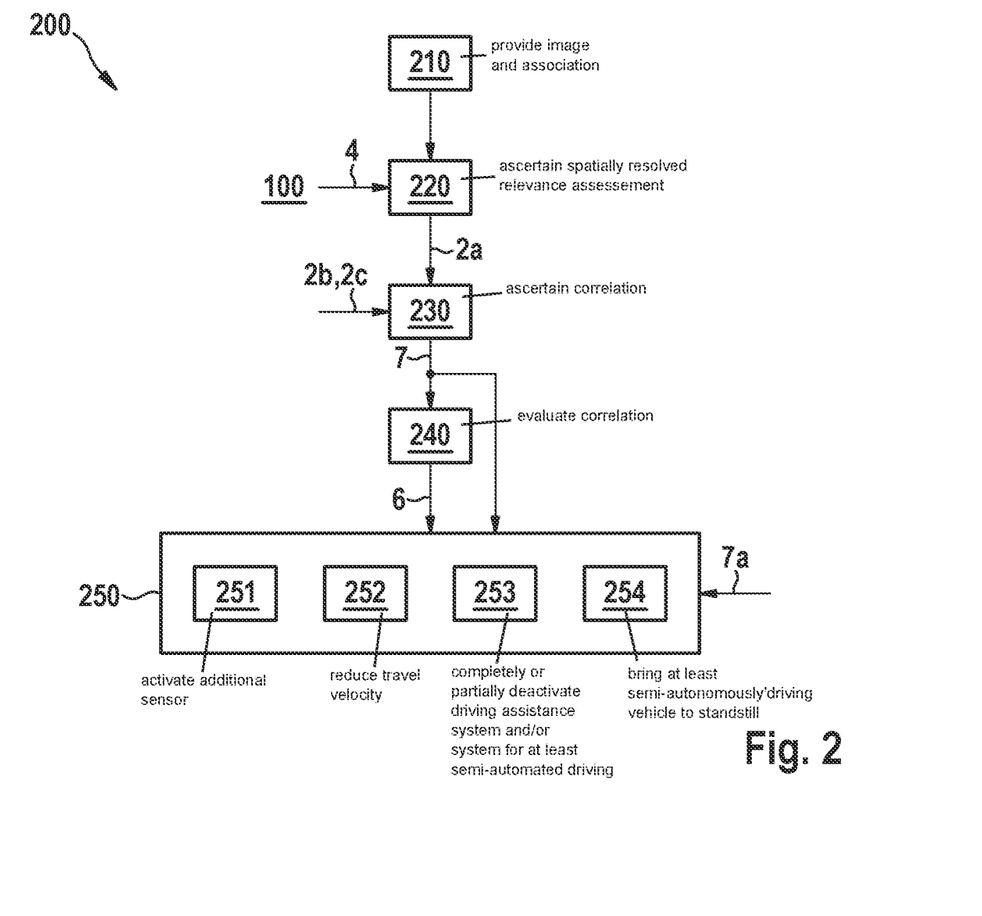
FIG. 2 shows one exemplary embodiment of method 200 with which plausibility 6 of the output of ANN 1 is assessed based on a specific relevance assessment function 4, in accordance with the present invention.

FIG. 2 is a schematic flowchart of one exemplary embodiment of method 200. This method 200 assumes that a suitable relevance assessment function 4 is already implemented.

Analogously to step 110 of method 100, at least one image 2 for which ANN 1 has ascertained an association 3 with one or multiple classes 3a through 3c of a predefined classification, and also association 3 that is ascertained by ANN 1, are provided in step 210 of method 200.

Analogously to step 120 of method 100, for the combination of image 2 and association 3, a spatially resolved relevance assessment 2a of image 2 is ascertained in step 220 of method 200 by applying relevance assessment function 4. This relevance assessment 2a indicates which portions of image 2, and to what extent, have contributed to association 3.

A correlation 7 between relevance assessment 2a on the one hand, and a semantic segmentation 2b of the image 2 and/or an edge detection 2c from image 2 on the other hand, is ascertained in step 230. This correlation 7 is evaluated in step 240 as a measure for plausibility 6 of the output of ANN 1.

This plausibility 6, or also correlation 7 directly, may then be compared to a threshold value 7a in step 250, and a system that acts at least semi-automatedly may be activated in such a way that disadvantageous consequences of an incorrect association are reduced.

Various examples are provided within box 250 that indicate how this activation may be designed specifically for vehicles.

According to block 251, at least one additional physical sensor for observing the surroundings of the vehicle may be activated.

According to block 252, the travel velocity of a vehicle that is driving at least semi-automatedly is reduced. For example, as a precaution the vehicle on the expressway may be controlled to drive into the slower traffic in the right lane.

According to block 253, a driving assistance system and/or a system for the at least semi-automated driving of the vehicle may be completely or partially deactivated.

According to block 254, an at least semi-automatedly driving vehicle may be brought to a standstill on a pre-planned emergency stop trajectory. For the case of a system failure, in each system such an emergency stop trajectory is the standard default for the at least semi-automated driving.

Figure 3:
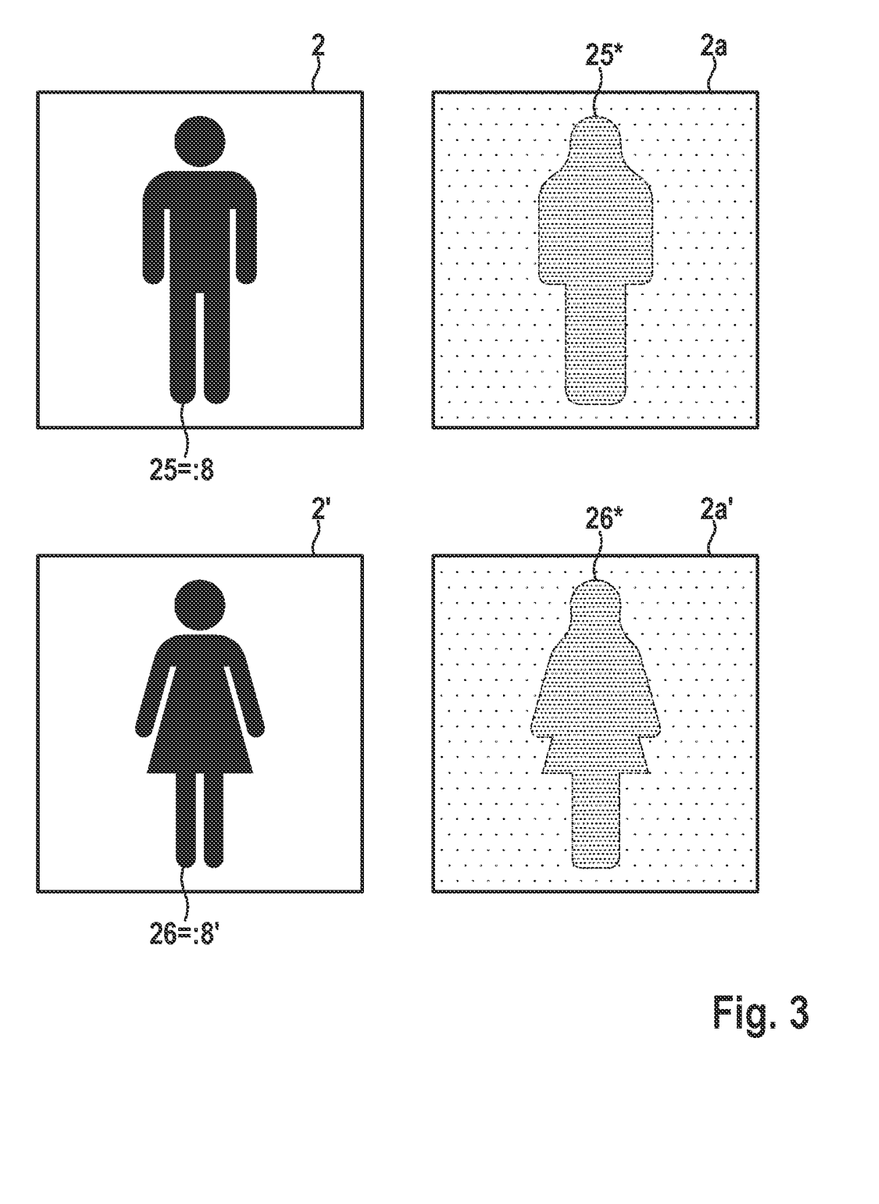
FIG. 3 shows an example of invariance of a relevance assessment 2a with respect to an exchange of an object 25 with an object 26 of virtually the same size, in accordance with the present invention.

FIG. 3 schematically illustrates an example in which a relevance assessment function 4, and thus also a relevance assessment 2a supplied by this function 4, is invariant with respect to an exchange of objects 25, 26 in image 2.

A first image 2 shows a man 25 that functions as a feature parameter 8. If this man 25 is recognized and classified by ANN 1, for this purpose area 25* that is marked with a higher point density is definitive in spatially resolved relevance assessment 2a.

A second image 2' shows a woman 26 as an altered feature parameter 8'. If this woman 26 is recognized and classified by ANN 1, for this purpose area 26* that is marked with a higher point density is definitive in spatially resolved relevance assessment 2a'.

This area 26* is much more similar to area 25* than woman 26 is to man 25. The differences are due essentially to differences in the spatial extent.

Relevance assessment function 4 with which spatially resolved relevance assessments 2a, 2a' have been created is thus essentially invariant with respect to an exchange of man 25 with woman 26.

Figure 4:
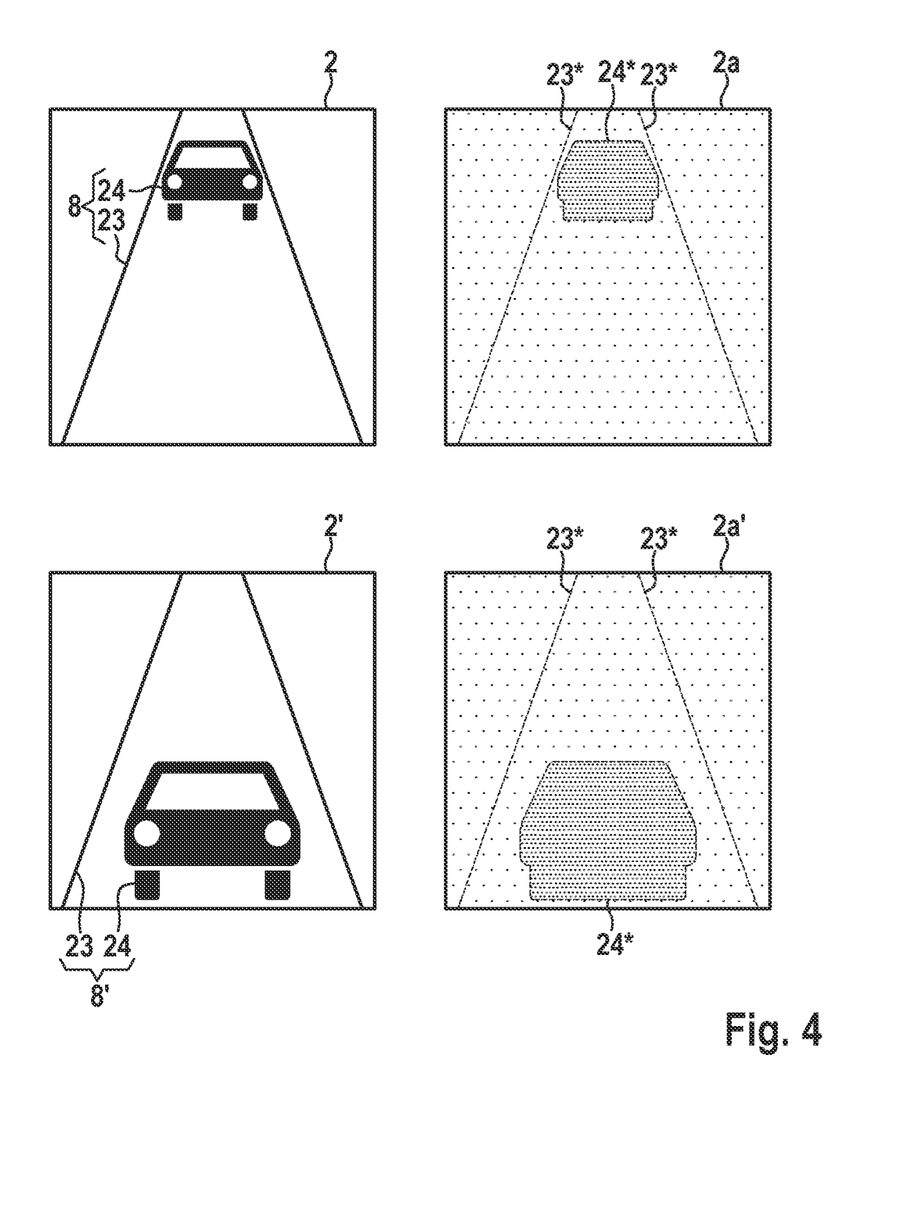
FIG. 4 shows an example of equivariance of a relevance assessment 2a with respect to a change in position and size of an object 24, in accordance with the present invention.

FIG. 4 schematically illustrates an example in which a relevance assessment function 4, and thus also a relevance assessment 2a supplied by this function 4, is equivariant with respect to the change in position and size of objects 23, 24.

A first image 2 shows a road 23 and a vehicle 24 that is moving toward the observer. Road 23 and vehicle 24 together form feature parameter 8 of image 2. In spatially resolved relevance assessment 2a for this image 2, the edges of road 23 are represented by areas 23* having higher relevance. Vehicle 24 is represented in this relevance assessment 2a via a further area 24* having higher relevance.

A second image 2' is a snapshot of same road 23 and of same vehicle 24 taken at a slightly later time. In contrast to first image 2, vehicle 24 has moved further toward the observer. In this regard, feature parameter 8' is changed compared to feature parameter 8 of first image 2. This change is also reflected in relevance assessment 2a' for second image 2'. The edges of road 23 are still represented by same areas 23* as in relevance assessment 2a. However, area 24* representing vehicle 24 has become larger, and within spatially resolved relevance assessment 2a', compared to original relevance assessment 2a, has moved similarly to the vehicle in comparison to the two images 2 and 2'.

Relevance assessment function 4, with which spatially resolved relevance assessments 2a, 2a' have been created, is thus equivariant with respect to a movement of objects in image 2, 2'.

Figure 5:
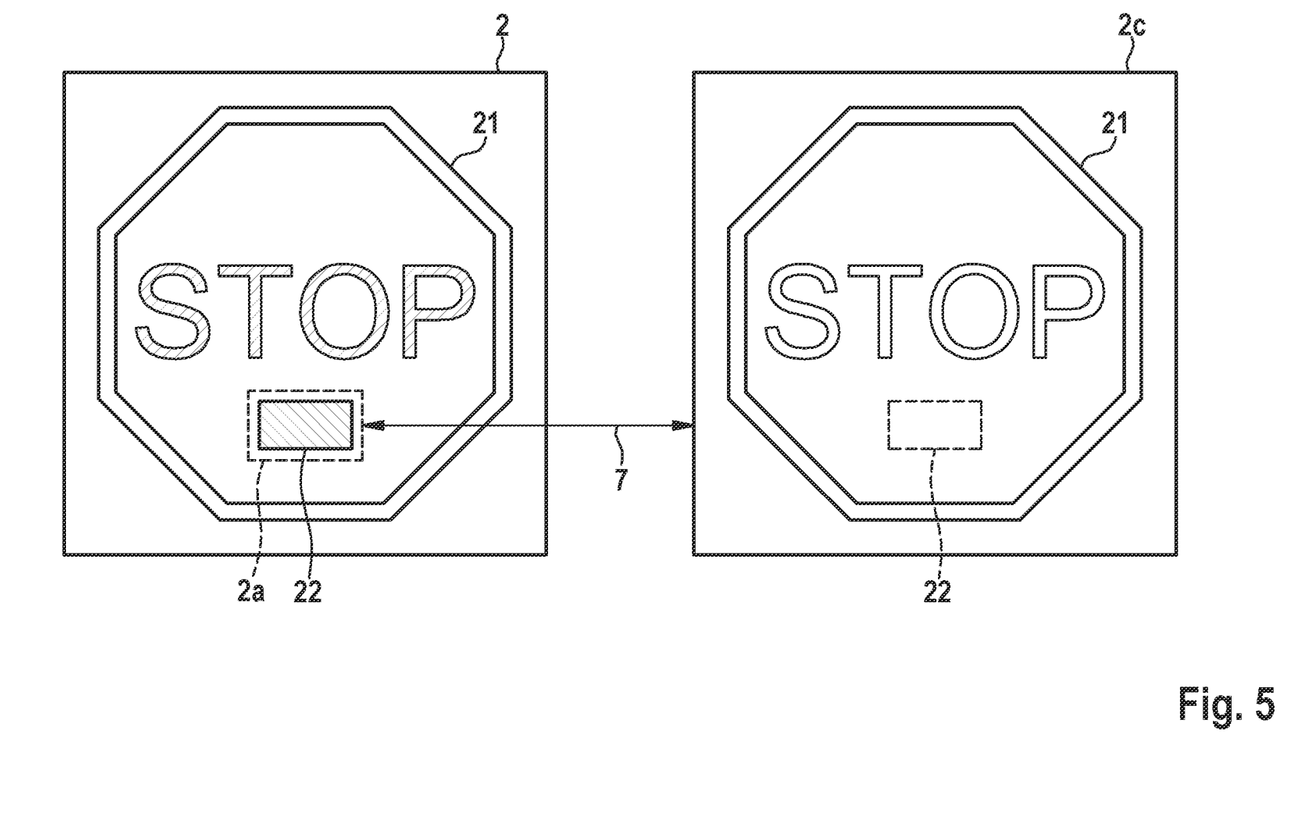
FIG. 5 shows an example of recognition of an attack using an "adversarial example," by method 200, in accordance with the present invention.

FIG. 5 shows an example of how an attack on an ANN 1 used as a classifier may be recognized by method 200, using an "adversarial example," i.e., a manipulated image 2. In this example, image 2 shows a stop sign 21 which with malicious intent has been provided with an adhesive sticker 22. This adhesive sticker 22 has intentionally been designed so that ANN 1 is to classify stop sign 21 not as a stop sign, but instead as a speed limit 70 sign, for example.

If ANN 1 is successfully "deceived" in this way, this implies that the area with adhesive sticker 22 has a particularly strong influence on association 3 that is ascertained by ANN 1. This means that this area has a particularly high weight in spatially resolved relevance assessment 2a compared to the remainder of image 2. This is illustrated in FIG. 3 in that only the area with adhesive sticker 22 is marked and provided with reference numeral 2a.

In contrast, edge detection 2c from image 2 places particular emphasis on the features of stop sign 21, while adhesive sticker 22 is only barely recognizable, if at all. Adhesive stickers 22 that are affixed with malicious intent to signs are in fact intended to be as visually inconspicuous as possible so that no one discovers and removes them.

Thus, the very features of stop sign 21 that are particularly prominent in edge detection 2c have virtually no relevance in spatially resolved relevance assessment 2a. Likewise, adhesive sticker 22, which is so important for relevance assessment 2a, has virtually no relevance in edge detection 2c. Correlation 7 between relevance assessment 2a and edge detection 2c is thus poor, which may be recognized using method 200.

What is claimed is:

1. A method for a plausibility check of an output of an artificial neural network (ANN) that is used as a classifier, the method comprising the following steps:
providing a plurality of images for which the ANN has ascertained an association with one or multiple classes of a predefined classification, and the association that is ascertained for each of the images by the ANN;
determining, for each of the images, at least one feature parameter which characterizes a type, and/or a degree of specificity, and/or a position, of at least one feature contained in the image;
for each combination of an image of the images and an association of the associations, ascertaining a spatially resolved relevance assessment of the image by applying a relevance assessment function, the relevance assessment indicating which portions of the image, and to what extent, have contributed to the association;
ascertaining a setpoint relevance assessment for each combination of an image of the images and an association of the associations, using the feature parameter; and
ascertaining a quality criterion for the relevance assessment function based on an agreement between the relevance assessments and the setpoint relevance assessments, wherein based on a first combination of a first image of the images and a first association of the associations, a spatially resolved relevance assessment of the first combination, and a first feature parameter of the first image, a second setpoint relevance assessment for a second combination of a second image and a second association, and for a second feature parameter of the second image, is ascertained by updating the spatially resolved relevance assessment based on a difference between the first feature parameter and a second feature parameter.

2. The method as recited in claim 1, wherein the second image arises from the first image by a transformation and/or processing which leaves the feature parameter unchanged or changes it to a new feature parameter.

3. The method as recited in claim 1, wherein at least one image is synthetically generated by specifying a particular feature parameter.

4. The method as recited in claim 1, wherein at least one feature parameter of the feature parameters is evaluated from measured data that have been detected using at least one physical sensor that is different from a sensor that is used for recording the respective image.

5. The method as recited in claim 1, wherein the quality criterion is ascertained for a selection of multiple candidate relevance assessment functions, and a particular candidate relevance assessment function of the multiple candidate relevance assessment functions that has a best value of the quality criterion is selected as the relevance assessment function.

6. The method as recited in claim 5, wherein a relevance assessment function or candidate relevance assessment function whose quality criterion is poorer than the quality criterion ascertained for a comparative relevance assessment function is discarded as implausible.

7. The method as recited in claim 1, wherein the quality criterion is additionally ascertained for:
an identical depiction of the image, and/or
an area filled with random values, and/or
an area filled with a constant value, and/or
a semantic segmentation of the image, and/or
an edge detection from the image as the spatially resolved comparative relevance assessment.

8. The method as recited in claim 1, wherein a parameterized approach with free parameters is established for the relevance assessment function, and parameters of the approach are optimized with an objective that the quality criterion of the relevance assessment function assumes an extreme value.

9. The method as recited in claim 1, wherein a plausibility of the output of the ANN is evaluated based on the relevance assessment function and/or based on the quality criterion of the relevance assessment function and/or based on a relevance assessment that is ascertained with the relevance assessment function.

10. The method as recited in claim 9, wherein the plausibility is output to a user of the ANN via a display.

11. The method as recited in claim 1, wherein the ANN is a convolutional ANN, and the relevance assessment function involves a weighted sum of activation maps of multiple convolution kernels which, in a layer of the ANN, are applied to the image or to a processing product of the image.

12. A method for a plausibility check of an output of an artificial neural network (ANN) that is used as a classifier, the method comprising the following steps:
providing at least one image for which the ANN has ascertained an association with one or multiple classes of a predefined classification, and the association that is ascertained by the ANN;
for a combination of the image and the association, ascertaining a spatially resolved relevance assessment of the image by applying a relevance assessment function, the relevance assessment indicating which portions of the image, and to what extent, have contributed to the association;
ascertaining a correlation between: (i) the relevance assessment, and (ii) a semantic segmentation of the image and/or an edge detection from the image; and
evaluating the correlation as a measure for the plausibility of the output of the ANN, wherein the relevance assessment function is selected and/or formed during the course of a method including:
providing a plurality of images for which the ANN has ascertained an association with one or multiple classes of a predefined classification, and the association that is ascertained for each of the images by the ANN;
determining, for each of the images, at least one feature parameter which characterizes a type, and/or a degree of specificity, and/or a position, of at least one feature contained in the image of the images;
for each combination of an image of the images and an association of the associations, ascertaining a second spatially resolved relevance assessment of the image of the images by applying a second relevance assessment function, the relevance assessment indicating which portions of the image of the images, and to what extent, have contributed to the association;
ascertaining a setpoint relevance assessment for each combination of an image of the images and an association of the associations, using the feature parameter; and
ascertaining a quality criterion for the second relevance assessment function based on an agreement between the second relevance assessments and the setpoint relevance assessments;
wherein the quality criterion is ascertained for a selection of multiple candidate relevance assessment functions, and a particular candidate relevance assessment function of the multiple candidate relevance assessment functions that has a best value of the quality criterion is selected as the relevance assessment function.

13. The method as recited in claim 12, wherein in response to the correlation falling below a predefined threshold value, a technical system that acts at least semi-automatedly based on the association ascertained by the ANN is activated in such a way that disadvantageous consequences of an incorrect association are reduced.

14. The method as recited in claim 12, wherein a first image is selected that has arisen by observing surroundings of a vehicle, and in response to the correlation falling below a predefined threshold value, the vehicle is controlled in such a way that:
at least one additional physical sensor for observing the surroundings of the vehicle is activated; and/or
a travel velocity of an at least semi-automatedly driving vehicle is reduced; and/or
a driving assistance system and/or a system for the at least semi-automated driving of the vehicle is completely or partially deactivated; and/or
an at least semi-automatedly driving vehicle is brought to a standstill on a preplanned emergency stop trajectory.

15. A non-transitory machine-readable data medium on which is stored a computer program for a plausibility check of an output of an artificial neural network (ANN) that is used as a classifier, the computer program, when executed by a computer, causing the computer to perform the following steps:
providing a plurality of images for which the ANN has ascertained an association with one or multiple classes of a predefined classification, and the association that is ascertained for each of the images by the ANN;
determining, for each of the images, at least one feature parameter which characterizes a type, and/or a degree of specificity, and/or a position, of at least one feature contained in the image;
for each combination of an image of the images and an association of the associations, ascertaining a spatially resolved relevance assessment of the image by applying a relevance assessment function, the relevance assessment indicating which portions of the image, and to what extent, have contributed to the association;
ascertaining a setpoint relevance assessment for each combination of an image of the images and an association of the associations, using the feature parameter; and
ascertaining a quality criterion for the relevance assessment function based on an agreement between the relevance assessments and the setpoint relevance assessments, wherein based on a first combination of a first image of the images and a first association of the associations, a spatially resolved relevance assessment of the first combination, and a first feature parameter of the first image, a second setpoint relevance assessment for a second combination of a second image and a second association, and for a second feature parameter of the second image, is ascertained by updating the spatially resolved relevance assessment based on a difference between the first feature parameter and a second feature parameter.

16. A computer configured to plausibility check an output of an artificial neural network (ANN) that is used as a classifier, the computer configured to:
provide a plurality of images for which the ANN has ascertained an association with one or multiple classes of a predefined classification, and the association that is ascertained for each of the images by the ANN;
determine, for each of the images, at least one feature parameter which characterizes a type, and/or a degree of specificity, and/or a position, of at least one feature contained in the image;
for each combination of an image of the images and an association of the associations, ascertain a spatially resolved relevance assessment of the image by applying a relevance assessment function, the relevance assessment indicating which portions of the image, and to what extent, have contributed to the association;
ascertain a setpoint relevance assessment for each combination of an image of the images and an association of the associations, using the feature parameter; and
ascertain a quality criterion for the relevance assessment function based on an agreement between the relevance assessments and the setpoint relevance assessments, wherein based on a first combination of a first image of the images and a first association of the associations, a spatially resolved relevance assessment of the first combination, and a first feature parameter of the first image, a second setpoint relevance assessment for a second combination of a second image and a second association, and for a second feature parameter of the second image, is ascertained by updating the spatially resolved relevance assessment based on a difference between the first feature parameter and a second feature parameter.

* * * * *